UNITED STATES PATENT OFFICE.

JOSIAH K. LILLY, OF INDIANAPOLIS, INDIANA, ASSIGNOR TO THE ELI LILLY AND COMPANY, OF INDIANAPOLIS, INDIANA, A CORPORATION OF INDIANA.

ENTERIC PREPARATION OF IPECAC ALKALOIDS.

1,334,463.  Specification of Letters Patent.  Patented Mar. 23, 1920.

No Drawing.  Application filed August 14, 1915. Serial No. 45,577.

*To all whom it may concern:*

Be it known that I, JOSIAH K. LILLY, a citizen of the United States, residing at Indianapolis, Marion county, and State of Indiana, have invented and discovered certain new and useful Improvements in Enteric Preparation of Ipecac Alkaloids, of which the following is a specification.

Experience has demonstrated that ipecac has a specific action in the treatment of certain diseases, it having been found particularly valuable in the treatment of pyorrhea and amoebic and other forms of dysentery. Its oral administration for such purposes has been impracticable, however, because of its nauseating characteristics, except with the intervention of an enteric coating, covering, or container, and its use in such diseases has been confined largely to administration by injection in the form of emetine, one of its alkaloids. I have discovered, however, that the alkaloids of ipecac when prepared by combining with Lloyd's reagent, fullers' earth, or other efficient adsorbent agents, will carry the alkaloids through the stomach, which is normally acid, and yield them up in the intestines, which are normally alkaline, thus passing the medicine into the circulation where it exerts its remedial effect without causing emesis or nausea.

My invention consists, therefore, in an enteric medicinal preparation containing an alkaloid or alkaloids of ipecac in a form to pass through the stomach without emesis or nausea and be released into the circulation through the agency of the alkaline secretions of the intestines.

The process of making this compound while capable of modification and variation in details, may be described substantially as follows:—

The drug ipecac properly ground or comminuted is exhausted, as by percolation, with water containing one per cent. of sulfuric or other appropriate acid. To this percolate is added in proper proportionate quantities hydrated aluminum or magnesium silicate, or any other insoluble adsorbing agent which may be found efficient. The alkaloids of ipecac are thus adsorbed and separated from the supernatant liquid by allowing to settle, decantating and straining, the resulting combination of the alkaloids with the adsorbing agent is then dried and assayed as to the alkaloidal content. It is then brought by appropriate methods to a fixed standard of alkaloidal content and prepared in form for convenient administration, such as tablet or capsule form, each tablet or capsule containing a definite quantity of the alkaloid or alkaloids. In such form the medicine is capable of administration through the mouth without the intervention of any coating or covering and without causing nausea or emesis and the remedial action of the medicine is immediately begun and exerted through the circulation as before mentioned.

It will be understood that this invention includes the use of any, some or all of the alkaloids of ipecac, or any of their derivatives found appropriate for the purpose.

I use the term "adsorbent" in this disclosure to define a substance so combining with the alkaloids of ipecac that in acid medium said alkaloids are prevented from entering into solution but are rendered capable of entering into solution when placed in an alkaline medium; to illustrate, when present in the stomach, which is usually acid, the alkaloids of ipecac are retained by this adsorbent, but as it passes from the stomach into the intestines, which are usually alkaline, the alkaloids are gradually separated from the adsorbent.

Having thus described my said invention, what I claim is:

1. A medicinal preparation comprising derivatives of ipecac alkaloids and an adsorbent substance which is adapted to carry said derivatives through the stomach and yield them up in the intestines.

2. A medicinal preparation comprising alkaloids of ipecac and an adsorbent agent adapted to carry said alkaloid through the stomach and yield it up to the circulation through the agency of the alkaline secretions of the intestines.

3. A medicinal preparation including derivatives of ipecac alkaloids combined with an adsorbent agent adapted to carry them through the stomach, prepared in uncovered tablet form.

4. A medicinal preparation containing alkaloids of ipecac combined with an adsorbent agent capable to prevent the solution and absorption of alkaloid in the acid medium of the stomach and to release said alkaloid in the alkaline medium of the intestines.

5. A medicinal preparation for internal administration containing alkaloids of ipecac combined with aluminum silicate as an adsorbent agent.

In witness whereof I have hereunto set my hand and seal at Indianapolis, Indiana, this 11th day of Aug., A. D. nineteen hundred and fifteen.

JOSIAH K. LILLY. [L. S.]

Witness:
    E. W. BRADFORD.